No. 875,355.

PATENTED DEC. 31, 1907.

E. M. KNIGHT.
FILTER MEDIUM.
APPLICATION FILED JULY 24, 1907.

WITNESSES

INVENTOR
Edward M. Knight;
BY
ATTORNEY

UNITED STATES PATENT OFFICE.

EDWARD M. KNIGHT, OF SAN FRANCISCO, CALIFORNIA.

FILTER MEDIUM.

No. 875,355.    Specification of Letters Patent.    Patented Dec. 31, 1907.

Application filed July 24, 1907. Serial No. 385,257.

*To all whom it may concern:*

Be it known that I, EDWARD M. KNIGHT, a citizen of the United States, residing in the city and county of San Francisco and State of California, have invented new and useful Improvements in Filter Mediums, of which the following is a specification.

This invention relates to filtering pads for that class of filter which acts under direct pressure from the main, and the said invention has for its object the provision of a fibrous filtering medium of asbestos and carbon, having a novel structure, and made sufficiently strong to withstand heavy pressure.

Figure 1:
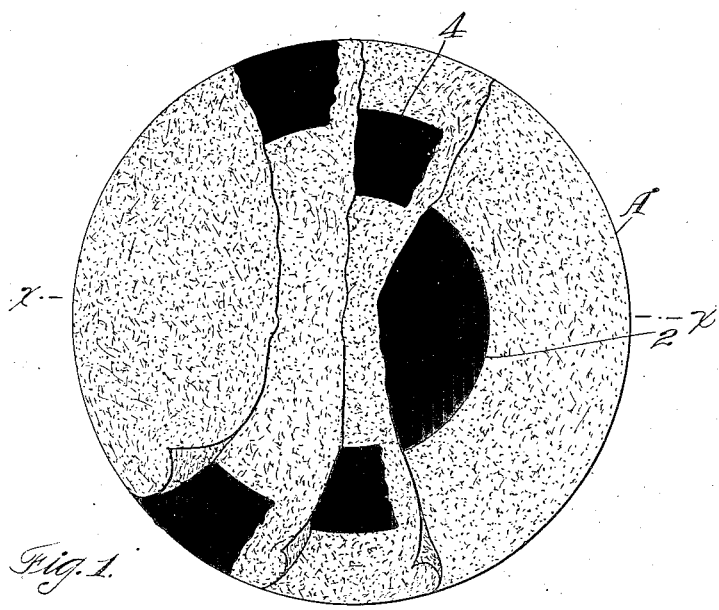
Figure 2:
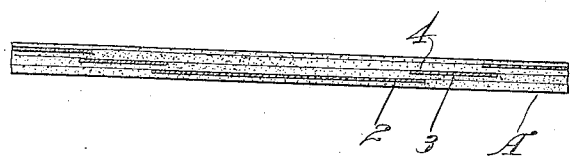

Referring to the accompanying drawings, for a more complete explanation of my invention—Figure 1 is a plan view with portion broken away. Fig. 2 is a section through X—X of Fig. 1.

It has been found in practice that two layers of compressed asbestos fiber will not adhere permanently, whether carbonated or uncarbonated. Hence the difficulty, hitherto, of manufacturing filtering media of this material. The method I propose to adopt in the construction of my filtering pad is one in which the joints are formed from the uncompressed asbestos, the fibers of which readily interlock, the layers of carbon and asbestos becoming thereby interstratified.

For the purpose of my invention I take a shallow tray, square, round or oval, according to shape of pad required. In the tray I place carded asbestos A, spreading it evenly, and then compress a part thereof, *e. g.* the central portion, about one-third of the whole area. This compressed portion I carbonate, by spreading over it an even layer of carbon 2, preferably in the form of paste. This carbonated area, and the uncarbonated and uncompressed area are next covered with carded asbestos. I then compress a zone, 3 concentric with the carbonated portion, and in area about one-third of the whole area of the pad. This zone is then carbonated at 4 in the same manner as above described with reference to the central portion, and a layer of carded asbestos is so placed that it covers the newly carbonated area thickly, and the uncarbonated area lightly. The remaining portion of the surface, as yet untreated, is, in its turn, compressed, carbonated and covered with carded asbestos in exactly the same manner as the two previous portions. The whole pad is then compressed.

The result of this process is a pad, carbonated throughout and firmly held together by the interstratification of the carbon and asbestos, and by the interlacing of the asbestos fibers.

I do not confine myself to three stages in the manufacture of my improved filtering pads, as it is obvious I may have more than three stages, or in some cases only two.

In pads made as heretofore the asbestos layers confining the carbon are fastened together only at the edges. Therefore, in pads of large area, the weight of the carbon, being entirely unsupported at the center, causes the asbestos to break away at the joints, and the pad becomes practically useless. By my improved method the asbestos and carbon layers are fastened together throughout their surfaces, and are therefore very strong and tough, and are specially adapted for the purposes of filtration under great pressure.

The filtering medium when at work is held in position in a frame or holder, in any suitable manner.

Having thus described my invention, what I claim and desire to secure by Letters Patent is—

1. The process of preparing a filtering medium, said process consisting in compressing alternate layers of carded asbestos and layers of carbon, so that said layers of carbon are interstratified with the asbestos.

2. The process of preparing filter mediums, said process consisting in superposing alternate zones of asbestos and carbon concentrically, so that the carbon is interstratified and held in place by the interlocking of the asbestos fiber.

3. The process of making filtering pads or disks, said process consisting in forming a disk with loose uncompressed asbestos fiber, then compressing a portion of it and coating it with carbon, superposing another disk of asbestos fiber so that its fibers will cover the carbonated portion of the first disk, and also interlock with the fibers of the first disk, then compressing and coating a portion of said second disk of asbestos fiber, and in the same or like manner adding successive disks of asbestos fiber and carbon to form a pad of asbestos interstratified with carbon over the whole area.

4. As an article of manufacture, a filtering pad consisting of superposed and interlocked layers of asbestos, having interposed zones of carbon interstratified with the asbestos.

5. As an article of manufacture, a filtering pad consisting of superposed layers of asbestos having portions of their area interlocked and intermediate portions coated with carbon, interstratified with the asbestos.

In testimony whereof I have hereunto set my hand in presence of two subscribing witnesses.

EDWARD M. KNIGHT.

Witnesses:
 GEO. H. STRONG,
 S. H. NOURSE.